(12) United States Patent
Jennings et al.

(10) Patent No.: US 7,126,675 B2
(45) Date of Patent: Oct. 24, 2006

(54) PULSE SHIFTED ARRAY

(75) Inventors: Martyn R Jennings, Bristol (GB); Lee D Miller, Portishead (GB)

(73) Assignee: Matra BAe Dynamics (UK) Ltd., Stevenage (GB)

( * ) Notice: Subject to any disclaimer, the term of this patent is extended or adjusted under 35 U.S.C. 154(b) by 0 days.

(21) Appl. No.: 11/258,243

(22) Filed: Oct. 26, 2005

(65) Prior Publication Data

US 2006/0082757 A1    Apr. 20, 2006

Related U.S. Application Data

(62) Division of application No. 10/381,139, filed as application No. PCT/GB01/04375 on Oct. 1, 2001.

(30) Foreign Application Priority Data

Oct. 5, 2000  (GB) .............................. 0024587.8

(51) Int. Cl.
G01C 3/08 (2006.01)

(52) U.S. Cl. ................... 356/5.01; 356/4.01; 356/5.07; 398/53; 250/227.12

(58) Field of Classification Search ............... 356/4.01, 356/5.01, 5.12, 28, 28.5, 141.5; 398/118, 398/119, 130, 139, 158, 161, 202, 214, 53, 398/102; 342/375; 250/227.12

See application file for complete search history.

(56) References Cited

U.S. PATENT DOCUMENTS

| | | | |
|---|---|---|---|
| 3,991,318 A * | 11/1976 | Duguay | 250/208.1 |
| 4,164,373 A | 8/1979 | Schuss et al. | |
| 4,380,391 A * | 4/1983 | Buser et al. | 356/5.06 |
| 4,395,121 A * | 7/1983 | Nory et al. | 356/141.1 |
| 5,025,148 A * | 6/1991 | Poisel et al. | 250/227.12 |
| 5,760,852 A | 6/1998 | Wu et al. | |
| 5,953,110 A | 9/1999 | Burns | |
| 6,163,372 A | 12/2000 | Sallce et al. | |
| 6,246,822 B1 | 6/2001 | Kim et al. | |
| 2001/0009458 A1 | 7/2001 | Asaka et al. | |

FOREIGN PATENT DOCUMENTS

| | | |
|---|---|---|
| EP | 0 283 538 B1 | 8/1990 |
| EP | 0 516 274 | 12/1992 |
| EP | 1 154 639 A1 | 11/2001 |
| GB | 1 525 463 | 9/1978 |
| GB | 2112244 B | 7/1983 |

OTHER PUBLICATIONS

JAPIO Abstract of JP 6034754, vol. 018253. Fujitsu.

* cited by examiner

*Primary Examiner*—Thomas H. Tarcza
*Assistant Examiner*—Isam Alsomiri
(74) *Attorney, Agent, or Firm*—Nixon & Vanderhye P.C.

(57) ABSTRACT

A laser-radar receiver comprising an array of optical fibers, wherein the opposite ends of the optical fibers are connected to at least one electromagnetic radiation detector, each of the optical fibers having differing physical characteristics which result in known delays in the transmission time of pulsed electromagnetic radiation.

12 Claims, 3 Drawing Sheets

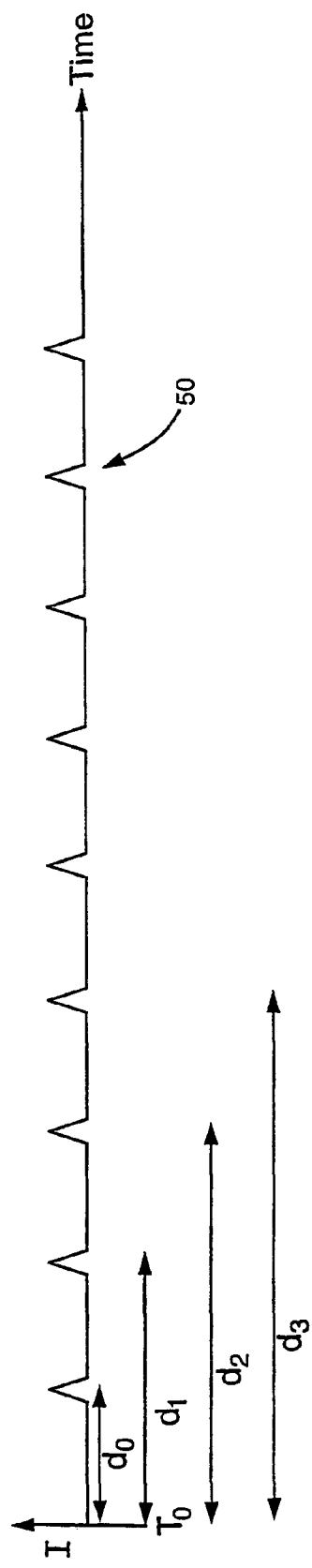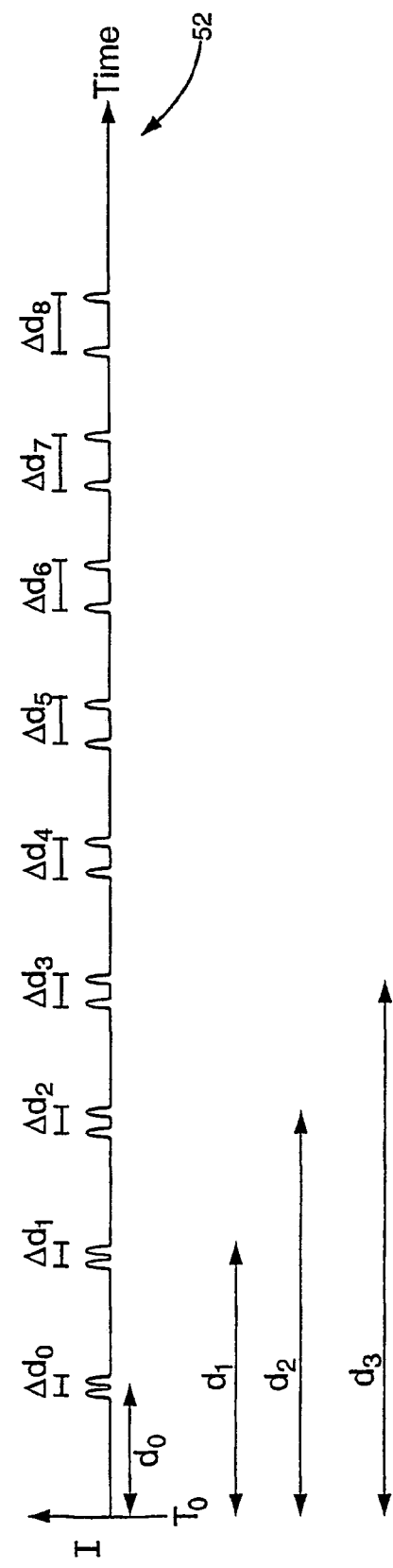

PULSE SHIFTED ARRAY

RELATED APPLICATIONS

This application is a Division of application Ser. No. 10/381,139, filed Mar. 21, 2003, which is the US national phase of international application PCT/GB01/04375, filed in English on 1 Oct. 2001, which designated the US. PCT/GB01/04375 claims priority to GB Application No. 0024587.8 filed 5 Oct. 2000. The entire contents of these applications are incorporated herein by reference.

BACKGROUND OF THE INVENTION

This invention relates to the field of laser-radar imaging and related sensor technology.

Conventional active laser-radar imaging systems provide an array of sensor elements which combine optically to capture an image of a body or target. The use of an active or pulsed light source such as a laser to illuminate the body or target generally provides an improved optical return, thereby allowing a three dimensional image of a scene to be captured. Such images comprise information relating to azimuth, elevation and range.

Where a laser is used as the active or pulsed light source to produce the required optical returns, it is advantageous to utilise short duration laser pulses in order to help reduce the energy levels required by the sensor systems. The use of such lasers helps achieve a greater range resolution.

Conventional sensor array detector elements used with active or pulsed light sources often have relatively long time constants which require shorter duration pulses to be integrated into longer pulses. This can lead to a reduction in the range resolution of the system as a whole. The use of active pulse light sources as a means of achieving greater range resolution has been made possible by the use of Q-switching, whereby laser sources can achieve nanosecond pulse durations. To help overcome the integration problems associated with conventional array detector elements, Avalanche Photo-Diodes (APD's) have been used. APDs can readily perform the required optical detection and processing of short duration pulses, but problems still exist in relation to the fabrication of APDs into arrays.

In a paper number #3065-04 presented at the SPIE AeroSense meeting (Apr. 20–25, 1997, Orlando, Fla.), a prototype active imaging laser-radar receiver was presented. The receiver incorporated an array of fibre coupled multi-channel receivers enables it to acquire images from a single laser pulse. Conventional scanned laser-radar imaging receivers require multiple pulses to assemble full images and suffer from jitter and image tearing caused by platform or target instability and other environmental effects. The paper proposed the use of a single pulse approach thereby eliminating distortions and providing high quality, high speed range based images.

The receiver as presented in the paper consisted of a focal plane array, formed of end polished multi-mode fibres. Each fibre acts as a light bucket, thereby capturing optical signals and relaying said signals to a series of detector elements. An array of APDs (APDs) was then utilised to detect and process light captured by the pixels formed by each end polished fibre-optic.

The configuration of the imaging laser-radar receiver as presented in the above referenced paper, requires that each pixel in the fibre-optic array has an associated APD detector. It therefore follows that, for example, a 24×24 array of pixel elements would require a total of 576 APD detector and processing elements. This makes any such a receiver comparatively large, and expensive in terms of the number of APDs and the associated electronics. In addition to the physical size and cost of developing such a system, the APD detection and processing electronics will remain largely dormant when a typical pulse repetition rate of 1 kHz is used. This follows because the detector is required to respond to pulses of a few nanoseconds duration, thereafter lying dormant for the remainder of the one millisecond pulse duration.

The invention provides for an imaging laser-radar receiver which requires substantially fewer detectors (and associated processing electronics) by utilising fibre-optic delay lines to supply time shifted pulses into each detector. The reduction in the number of detectors can provide for a physically smaller and more compact receiver system along with a corresponding reduction in the costs associated with the number of APDs required. Additionally, the invention provides flexibility in relation to the physical location of both detectors and associated electronics, thereby providing for further benefits in terms of packaging volume and the use of otherwise redundant space in host containers and vehicles.

BRIEF SUMMARY OF THE INVENTION

Accordingly there is provided a laser-radar receiver comprising an array comprised of the first ends of a plurality of optical fibres, wherein the corresponding opposite ends of said optical fibres are connected to at least one electromagnetic radiation detector means, each of said optical fibres having differing physical characteristics which result in known delays in the transmission time of plused electromagnetic radiation incident on said first ends of said optical fibres to said at least one electromagnetic detector means.

BRIEF DESCRIPTION OF THE DRAWINGS

The invention will now be described by way of example only with reference to the following drawings in which;

FIGS. 4a and 4b show a pulse train received by the apparatus of FIGS. 2 and 3 respectively.

DETAILED DESCRIPTION OF THE INVENTION

Figure 1:
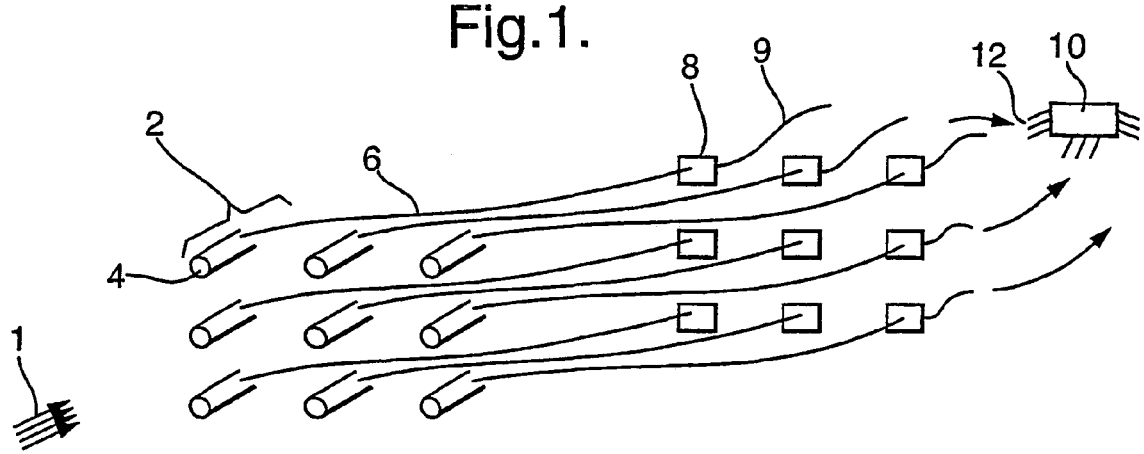
FIG. 1 shows a diagrammatic representation of a state of the art imaging laser-radar receiver.

FIG. 1 shows an array of nine fibre-optic cable end faces (pixels) 4 each having a fibre-optic cable transmission path 6 for carrying optical signals to a corresponding array of APD's 8. When a light source 1 is incident on the array of pixels 2, each fibre acts as a light bucket, capturing the optical signal 1 and relaying it via the fibre-optic transmission line 6 to the dedicated APD 8 for each cable. Each APD 8 provides the means for optical detection and processing of the light source 1, each having a corresponding output transmission line 9 for supplying the light information on to a further processing means 10 via input terminals 12. The further processing means 10 is then utilised to construct a three-dimensional image of the body illuminated by the light source. Each of the fibre-optic transmission lines 6 are of substantially equal length, thereby providing all light source information 1 falling on any of the pixels 4 in phase to the APD's 8.

Figure 2:
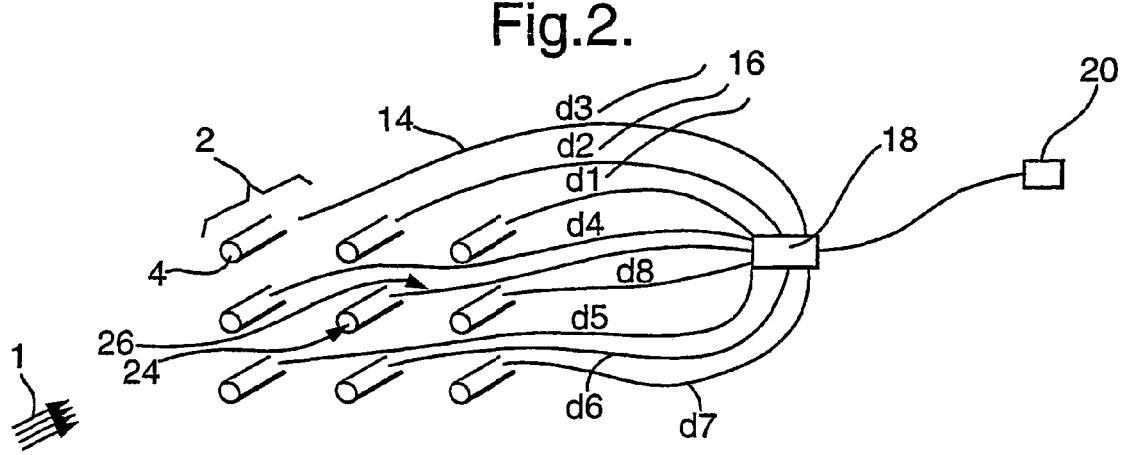
FIG. 2 shows a diagrammatic representation of an imaging laser-radar receiver in accordance with a first embodiment of the invention.

FIG. 2 shows an imaging laser-radar receiver in accordance with the invention having an identical number of pixels 4 to that described in the example shown in FIG. 1, but distinguished therefrom in that each of said fibre-optic transmission cables 14 carry light source information 1 to a single APD 18. The invention utilises delays 16 in the fibre-optic transmission lines 14 to provide time shifted pulses to the APD 18. In the 3×3 "cluster" of pixels shown in FIG. 2, all nine pixels feed one APD 18. The centre pixel 24 has the shortest fibre-optic transmission cable 26 for transmitting light source information 1 to the APD 18. Each of the remaining surrounding pixels are connected to the APD 18 by fibre-optic transmission lines 14, each having corresponding delays 16, each delay (d1, d2, d3 . . . d8) being different and each delay being provided in this example by a different length of fibre. This arrangement provides for the light source data 1 from the nine pixels to be multiplexed into the APD 18.

The selection of the centre pixel as that being the pixel having the shortest transmission path to the APD is for purposes of example only and is not intended to represent a limiting feature of the invention. Accordingly in an array, any one pixel could equally be selected to be that with the shortest time transmission path.

When comparing the system described in FIG. 1 with that of FIG. 2, it is apparent that in the 3×3 example in FIG. 2 provides for an arrangement which requires eight less APDs in order to provide the same light source data 1 to an APD for onward processing by the processor unit 20. This principle can be scaled to suit various arrays of pixels retaining the same benefits. For example in a 5×5 array it would be possible to utilise one centre pixel surrounded by twenty four further pixels, each utilising delays 16 in their respective optical transmission lines. When compared with a state of the art 5×5 array system following the teaching described in FIG. 1, a comparable system in accordance with the invention as described by FIG. 2 would use twenty four fewer APD elements.

An example of typical values used to explain the invention shown at in FIG. 2 now follows. In a 3×3 array it will be assumed that the delay lines 16 have lengths which are integer values (e.g. 40 m, 80 m, 120 m, 160 m . . . ). Light source information 1 travelling through a 40 m fibre having a refractive index of 1.5 will take 200 ns to travel from the pixel to the APD 18. The first pulse from the array will be from the centre pixel, unless an adjacent pixel is imaging an object which is more than 30 m (i.e. 40×1.5÷2) closer than the master pixel. This condition is known as a "range ambiguity" and is a consequence of using the pulse shifted array approach of the invention. In the unlikely event that such an ambiguity occurs, the processing unit 20 would detect not one, but two pulses in a 200 ns period thereby indicating that a range ambiguity problem or "false alarm" is present.

Another type of range ambiguity occurs when not all of the pixels in the array capture an optical signal. This may occur for example, when the array is directed towards the edge of the body or target and not all of the pixels receive a reflected pulse.

Assuming that no range ambiguities exist in the example, the APD 18 will see the pulse from the centre pixel followed by eight sequential pulse from the surrounding pixels. Each pulse will occur at or about 200 ns intervals depending on the physical relationship between the plane of the array of pixels and the angle to the light source. Hence, the train of nine pulses will have been detected within about 1.6 μs (i.e. 8×200 ns). Assuming a typical imaging at frame rate of 1 kHz it will be evident that many more surrounding pixel pulses could be detected in the example given above, where a 1 kHz repetition rate implies a window of 1 millisecond (1000 μs). The range to an object, regardless of whether it is the centre or a surrounding pixel can therefore be determined for each pixel and a 3 dimensional image of the illuminated object constructed.

A further aspect to be taken into account when considering the example in FIG. 2, is the total length of fibre-optic cable required. In the example the first surrounding pixel has an associated 40 m fibre, and the last (i.e. 8th) has a 320 m fibre. The length of fibre required for each 3×3 array using the invention as described in accordance with FIG. 2 is 1.44 km. If this figure is now applied to a scaled up and representative array size of 24×24 pixels, then utilising one APD per nine pixels results in a requirement for sixty four 3×3 arrangements. Accordingly, the total length of fibre-optic cable required for a 24×24 pixel array would equal 92 km. Using fibres with an outside diameter of 100 μm and assuming a packing density of 78% (i.e. π/4), this would result in a fibre-optic volume requirement of 900 cc.

This volume can be further reduced by a factor of four if 50 μm diameter fibre was utilised. Further reductions in the fibre volume requirement could also be achieved by the use of mirrored end fibres to produce 2-pass 'stub' delay lines. The introduction of such 2-pass stub delay lines could effectively halve the physical length of the fibre transmission lines 14.

If a range ambiguity such as those described above does exist, this may be addressed by using a known range finder in conjunction with the apparatus according to the present invention. Alternatively, the apparatus may be adapted to eliminate range ambiguities. This might be done by identifying which pixel transmits which signal to the ADP. This could be done in a variety of different ways, including that described below with respect to FIG. 3.

Figure 3:
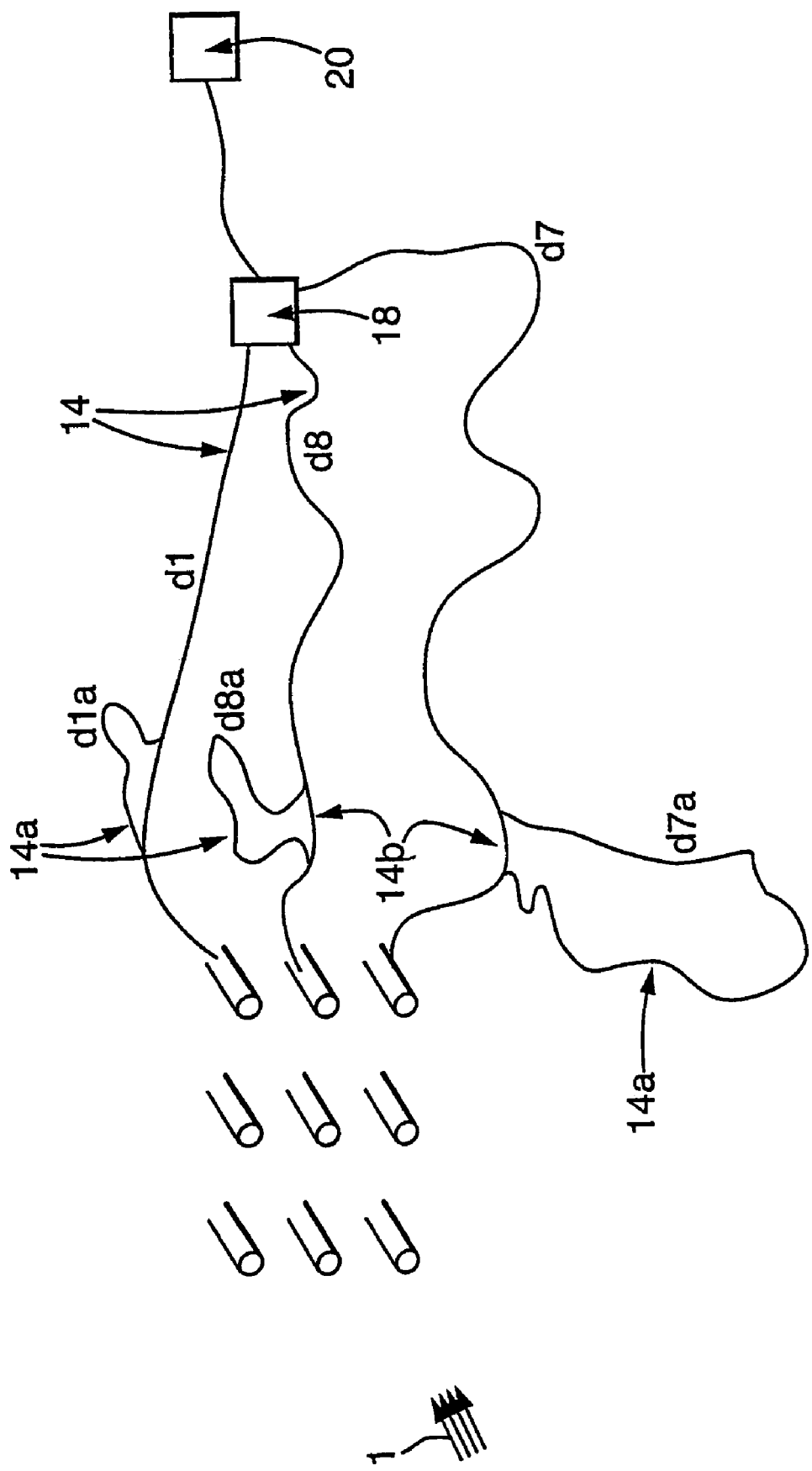
FIG. 3 shows a diagrammatic representation of an imaging laser-radar receiver which is a variant of that shown in FIG. 2.

FIG. 3 shows an imaging laser-radar receiver similar to that of FIG. 2, but only the fibre-optic transmission cables 14 from three of the pixels are shown for reasons of clarity. Each pixel has a fibre-optic cable 14 for carrying light source information to a single APD 18. Each of the fibre-optic transmission cables 14 are of a different length as described with respect of FIG. 2, but differ from those shown in FIG. 2 in that they each have an alternative path 14a. Thus light travelling along a fibre-optic transmission cable 14 arrives at a junction, and can either travel along the original fibre-optic transmission cable 14 or can travel along the alternative path 14a. The alternative path is a fibre-optic transmission cable having the same or similar characteristics to the original fibre-optic transmission cable 14. The alternative path 14a joins up with the original fibre-optic transmission cable 14 prior to arrival at the APD18. The alternative path 14a is of a different length to the corresponding portion 14b of the original fibre-optic transmission cable 14. Thus light which travels along the longer path (in this example 14a, although the alternative path could instead be adapted to be shorter than the original one) arrives at the APD 18 later than the light which travels along the shorter path (in this example 1b), the difference being Δd. The difference in arrival times Δd of the two light pulses from any one pixel at the APD 18 is preferably very small in comparison to the difference in arrival times of light pulses from the different pixels. (e.g. the difference between d1 and d8). Each pixel has an alternate path of different length from those of other pixels, so that the difference Δd is different for the two light pulses being carried from each of the pixels. This allows the processor unit 20 to identify which pixel received the reflected light.

FIGS. 4a and 4b help to explain how range ambiguities can be eliminated using the apparatus described with respect to FIG. 3. The range is a function of the time taken for the light pulse to travel to the body or target and back plus the time for the light pulse to travel along the fibre-optic transmission cable 14.

The pulse train 50 is that which might be received by the APD 18 when the apparatus of FIG. 2 is used. Time $T_o$ is the time at which the first light source data 1 is received by a pixel. The delay in the signals reaching the ADP is different for each pixel due to the difference in cable length.

Assuming that light is received by the other pixels at virtually the same time, and that no range ambiguities exist, the pulse train 50 would occur. Any range ambiguity would result in the pulses either being in a different order than expected, or in fewer than a full set of pulses (in this example nine) being received, and the processor will not know which pixels received the light source data and therefore the processor will not know the cable length for those pixels and hence the range of the object.

If the apparatus of FIG. 3 is employed in the same situation, then the resulting pulse train 52 would occur. The difference between signals received from one pixel Δd is different for each pixel (Δd1, Δd2, etc.) and so each pixel receiving light source data can be identified by the processor. Any range ambiguity resulting in fewer than a full set of pulses being received would not hamper range calculations, as the processor is able to identify the pixel receiving the light source data, and therefore the processor will know the cable length of the pixel and the range of the object can be calculated.

Instead of using different lengths of fibre-optic cable for the alternative paths 14a, cables 14a having different characteristics could be used instead for each pixel.

It can be seen that the range ambiguity issue can be addressed in a variety of different ways.

Figure 5:
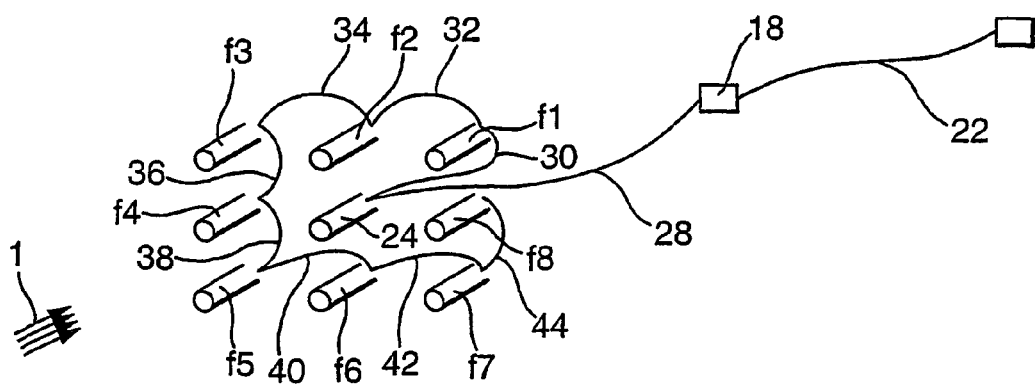
FIG. 5 shows an imaging laser-radar receiver in accordance with a second embodiment of the invention.

FIG. 5 shows a second embodiment of the invention wherein a different arrangement of fibre-optic delay lines 30, 32 . . . is provided. A pixel 24 hereinafter referred to as a 'master' pixel is connected to an APD 18 via fibre-optic transmission line 28 in a similar manner to that described in FIG. 2. The delay line 30 emanating from 'slave' pixel f1 is connected into the delay line 28 of the master pixel 24. Each of the remaining 'slave' pixels f2, f3, . . . , f8 are similarly connected in series, with delay line 32 from pixel f2 being connected into the delay line 30 of fibre-optic f1, and onwards into optical fibre transmission line 28. The sequence of connecting the fibre-optic delay line from each associated pixel into its neighbour provides for a delay line structure where for example light signals 1 incident on pixel f8 travel through fibre-optic delay line 44, on through fibre-optic delay line 42 associated with pixel f7, and similarly on through fibre-optic delay line 40 associated with pixel f6 until the signal is finally transmitted to the APD 18 via the master pixel optical fibre transmission line 28.

It will be evident that using the 'in series' delay line arrangement of FIG. 5 results in a time-shift effect for the slave pulses which are ultimately transmitted to the APD 18. Greater connection and interface losses will be expected with signals from the higher order slave pixels, along with ghost pulses due to multiple reflections along the length of the delay line fibres.

When comparing the length of fibre required to effect a 24×24 pixel array using the 'in series' arrangement, it follows that sixty four APD detector elements, each having eight×40 metres of fibre-optic transmission cable, results in an overall fibre length requirement of 20.5 km. When based on a fibre outside diameter and a packing density identical to that used in the example given in the embodiment described in FIG. 2, (i.e. 100 μm OD fibre and π/4 packing density) this corresponds to a fibre packing volume of 200 cc.

Alternative methods by which the delay may be introduced into the optical transmission lines of any of the laser-radar receivers described above in accordance with the present invention also include, but are not limited to, variations in the refractive index of the optical fibre material, and the use of optical fibres of differing materials.

Additionally, the cut ends 4 of the optical fibres 2 could be coated or covered with or by materials which act as filters, such as but not limited to band pass, high pass or low bass filters, thereby providing for the system to be designed to be responsive to particular ranges of electromagnetic energy wavelengths.

The invention as described above could alternatively comprise a focal plane array assembly.

The examples as described herein relate to arrays of pixel elements formed into regular square elements (i.e. 3×3, 4×4, 5×5 etc.). This feature should not be construed as limiting the invention to array patterns of regular shapes. Arrays in accordance with the invention may comprise pixels formed into regular or irregular or random layouts, be they planar or non-planar (i.e. 2 or 3 dimensional). Arrays may also be conformal, in that their application is such that they are required to be integrated into the outer surface such of a vehicle or body.

Additionally, the array size is not limited to one cluster of pixels. Any number of clusters may be combined to produce an overall array in accordance with the invention. Larger arrays may comprise clusters of pixels of any of the forms described by FIGS. 1, 2 or 3, or in any combination thereof.

Although short duration discrete pulses are preferable, it is possible to receive pulses of longer duration, such as pulses which have a duration longer than the inter-pulse spacing. In this case, the APD would experience a current which exhibited a step increase each time the APD received an optical signal from a pixel.

The quality of information obtained from utilising the present invention can be tailored for individual applications, by adjustment to the number of pulses within a given time period, and the duration of those pulses.

What is claimed is:

1. A laser-radar receiver comprising a plurality of optical fibres, each fibre having a first and second end, wherein the first ends of said optical fibres define an array and the second ends of said optical fibres are connected in series to adjacent optical fibres with the exception that, the second end of the last optical fibre in the fibres connected in series is connected to an electromagnetic radiation detector means, wherein known and differing delays are incurred in the transmission time of pulsed electromagnetic radiation incident on said array and traveling along each of the optical fibres to the electromagnetic detector means.

2. A laser-radar receiver in accordance with claim 1 wherein said array forms a conformal array.

3. A laser-radar receiver in accordance with claim 1 wherein said array forms a focal plane array.

4. A laser-radar receiver in accordance with claim 1 wherein said first ends of said optical fibres comprise means for selectively filtering the wavelength of laser energy transmitted to the detector means.

5. A laser-radar receiver in accordance with claim 1 wherein said array comprises a plurality of smaller individual arrays.

6. A laser-radar receiver, for receiving pulsed electromagnetic radiation, comprising a plurality of delay lines each having an input end and an output end, the input ends being arranged as an array to receive the electromagnetic radiation, and the delay lines are connected in series to an electromagnetic detector means whereby the transmission of electromagnetic radiation from each of the input ends to the detector means will be subject to a different time delay.

7. A laser-radar receiver, according to claim 6, in which each delay line comprises an optical fibre of which the length constitutes a time delay to the transmission of electromagnetic radiation from its input end to its output end, and the optical fibres are connected in series to the detector means.

8. A laser-radar receiver, according to claim 6, in which the array is a conformal array.

9. A laser-radar receiver, according to claim 6, in which the array is a focal plane array.

10. A laser-radar receiver, according to claim 6, in which said input ends include means for selectively filtering the wavelength of laser energy transmitted to the detector means.

11. A laser-radar receiver, according to claim 6, having an array formed from a plurality of smaller individual arrays.

12. A method of laser-radar imaging comprising:
- transmitting a pulse of electromagnetic radiation through a plurality of transmission paths whereby each transmission means will transmit a portion of said pulse,
- selecting said transmission paths such that each will cause a known delay in the transmission of its portion of said pulse to its output, and
- connecting said transmission paths in series to an electromagnetic radiation detector means whereby the transmission time of each portion of each pulse to the detector means will be different.

* * * * *